United States Patent
Gray et al.

(10) Patent No.: US 8,892,954 B1
(45) Date of Patent: Nov. 18, 2014

(54) MANAGING GROUPS OF APPLICATION VERSIONS

(75) Inventors: Jessica Lynn Gray, Seattle, WA (US); Michael Noth, Bothell, WA (US); James Kason Keiger, Seattle, WA (US); Siyang Xie, Redmond, WA (US)

(73) Assignee: Google Inc., Mountain View, CA (US)

(*) Notice: Subject to any disclaimer, the term of this patent is extended or adjusted under 35 U.S.C. 154(b) by 379 days.

(21) Appl. No.: 13/360,611

(22) Filed: Jan. 27, 2012

Related U.S. Application Data

(60) Provisional application No. 61/581,608, filed on Dec. 29, 2011.

(51) Int. Cl.
*G06F 11/00* (2006.01)
*G06F 9/445* (2006.01)
*G06F 3/048* (2013.01)

(52) U.S. Cl.
USPC ............. 714/38.11; 714/15; 714/16; 714/19; 717/174; 717/176; 715/968; 715/229

(58) Field of Classification Search
CPC . G06F 11/0742; G06F 11/0703; G06F 11/07; G06F 8/60; G06F 8/65; G06F 8/68
USPC ............. 714/15, 16, 19, 26, 38.11; 707/202, 707/204; 715/968, 229; 717/174, 176
See application file for complete search history.

(56) References Cited

U.S. PATENT DOCUMENTS 6,112,024 A * 8/2000 Almond et al. ............... 717/122
8,516,308 B1 * 8/2013 Gill et al. ..................... 714/38.1
2003/0051236 A1 * 3/2003 Pace et al. .................... 717/177
2006/0265708 A1 * 11/2006 Blanding et al. ............. 717/174
2010/0223560 A1 * 9/2010 Shenfield et al. ............ 715/744
2012/0036220 A1 * 2/2012 Dare et al. .................... 709/217

OTHER PUBLICATIONS

Booth, Simon P. et al., "Walk Backwards to Happiness—Debugging by Time Travel", Technical Report CSM-143, Department of Computing Science and Mathematics, University of Stirling, Stirling, Scotland, pp. 1-11 (Jul. 1997).
"Description of the Dr. Watson for Windows (Drwtsn32.exe) Tool", <http://web.archive.org/web/2009061819334/http://support.microsoft.com/kb/308538> (Oct. 29, 2007).
King, Samuel T. et al., "Debugging operating systems with time-traveling virtual machines", USENIX Annual Technical Conference, pp. 1-15 (2005).

(Continued)

*Primary Examiner* — Joshua P Lottich
*Assistant Examiner* — Jeison C Arcos
(74) *Attorney, Agent, or Firm* — McDermott Will & Emery LLP

(57) ABSTRACT

The subject matter of this specification can be implemented in, among other things, a computer-implemented method for application lifecycle management. The method includes receiving crash reports from a first version of an application at multiple initial computing devices. The first version of the application is from a first group of versions. The method further includes determining that the crash reports include more than a threshold amount of crash reports. The method further includes determining that a second version of the application from a second group of versions corrects a cause of the crash reports. The method further includes providing instructions to the initial computing devices to retrieve updates to the application from the second group of versions rather than the first group of versions.

18 Claims, 5 Drawing Sheets

(56) References Cited

OTHER PUBLICATIONS

Larson, Mark, "Google Chrome Release Channels", The Chromium Blog—News and developments from the open source browser project, <http://web.archive.org/web/20090116183046/http://blog.chromium.org/> (Jan. 8, 2009).

"Airbag, Google Crash Reporter", Google Operating System—Unofficial news and tips about Google, <http://web.archive.org/web/20070102125314/http://googlesystem.blogspot.com/2006/12/airbag-google-crash-reporter.html> (Dec. 27, 2006).

* cited by examiner

MANAGING GROUPS OF APPLICATION VERSIONS

CROSS-REFERENCE TO RELATED APPLICATIONS

This application claims the benefit of U.S. Provisional Application No. 61/581,608, filed on Dec. 29, 2011, and entitled "Managing Groups of Application Versions," which is incorporated herein by reference.

TECHNICAL FIELD

This instant specification relates to managing groups of versions for an application.

BACKGROUND

Oftentimes when an application encounters a problem that results in an abnormal termination of the application, such as a crash, a crash reporter will collect a dump of information related to the crash. The dump of information can include, for example, contents of memory that were accessible by the application and a state of a processor that was executing instructions from the memory. In some cases, a user can opt to allow the crash reporter to provide the dump of information to an entity that is responsible for the application, such as a company that developed the application. The company can then use the dump of information to diagnose and fix the problem that caused the crash.

SUMMARY

In one aspect, a computer-implemented method for application lifecycle management includes receiving a first number of crash reports from a first version of an application at multiple initial computing devices over a first period of time. The first version of the application is from a first group of versions. The method further includes determining that the first number of crash reports includes more than a first threshold amount of crash reports. The method further includes determining that a second version of the application from a second group of versions corrects a cause of the first number of crash reports in response to determining that the first number of crash reports includes more than the first threshold amount of crash reports. The method further includes providing instructions to the initial computing devices to retrieve updates to the application from the second group of versions rather than the first group of versions in response to determining that the second version of the application from the second group of versions corrects the cause of the first number of crash reports.

Implementations can include any, all, or none of the following features. The method can include determining that a third version of the application from the first group of versions corrects the cause of the first number of crash reports. The method can include providing instructions to the initial computing devices to retrieve updates to the application from the first group of versions rather than the second group of versions in response to determining that the third version of the application from the first group of versions corrects the cause of the first number of crash reports. The method can include preventing provision of the first version of the application to one or more additional computing devices in response to determining that the first number of crash reports includes more than the first threshold amount of crash reports. Determining that the first number of crash reports includes more than the first threshold amount of crash reports can be based on a frequency with which the first number of crash reports occur at the initial computing devices over the first period of time. Determining that the first number of crash reports includes more than the first threshold amount of crash reports can be based on a comparison between a number of the initial computing devices from which the first number of crash reports were received and a number of the initial computing devices to which the first version of the application was provided. Determining that the third version of the application from the first group of versions corrects the cause of the first number of crash reports can include receiving a second number of crash reports from the third version of the application at one or more other computing devices over a second period of time. The method can include determining that the second number of crash reports includes less than a second threshold amount of crash reports. The second threshold amount of crash reports can be lower than the first threshold amount of crash reports. The method can include providing instructions to the initial computing devices to include additional information in subsequent crash reports in response to determining that the first number of crash reports includes more than the first threshold amount of crash reports.

In one aspect, a computer-implemented system for application lifecycle management includes an interface that receives a first number of crash reports from a first version of an application at multiple initial computing devices over a first period of time. The first version of the application is from a first group of versions. The system further includes one or more memories that store the first number of crash reports and relationships between groups of versions and causes of crashes of the application. The groups of versions include at least the first group of versions and a second group of versions. The system further includes a crash report module that determines that the first number of crash reports includes more than a first threshold amount of crash reports, and determines that a second version of the application from the second group of versions corrects a cause of the first number of crash reports and, in response, provides instructions to the initial computing devices to retrieve updates to the application from the second group of versions rather than the first group of versions.

Implementations can include any, all, or none of the following features. The crash report module can determine that a third version of the application from the first group of versions corrects the cause of the first number of crash reports and, in response, can provide instructions to the initial computing devices to retrieve updates to the application from the first group of versions rather than the second group of versions. The system can include an application update module that provides the second version of the application to the initial computing devices in response to requests from the initial computing devices to update the application from the second group of versions. The application update module can prevent provision of the first version of the application to one or more additional computing devices in response to the crash report module determining that the first number of crash reports includes more than the first threshold amount of crash reports. The crash report module can determine that the first number of crash reports includes more than the first threshold amount of crash reports based on a frequency with which the first number of crash reports occur at the initial computing devices over the first period of time. The crash report module can determine that the first number of crash reports includes more than the first threshold amount of crash reports based on a comparison between a number of the initial computing devices from which the first number of crash reports were received and a number of the initial computing devices to which the first version of the application was provided. The interface can receive a second number of crash reports from the third version of the application at one or more other computing devices over a second period of time. The crash report module can determine that the third version of the application from the first group of versions corrects the cause of the first number of crash reports based on determining that the second number of crash reports includes less than a second threshold amount of crash reports that is lower than the first threshold amount of crash reports. The crash report module can provide instructions to the initial computing devices to include additional information in subsequent crash reports in response to determining that the first number of crash reports includes more than the first threshold amount of crash reports.

The details of one or more implementations are set forth in the accompanying drawings and the description below. Other features and advantages will be apparent from the description and drawings, and from the claims.

DETAILED DESCRIPTION

This document describes systems and techniques for using crash reports from an application to identify actions to be taken regarding which group of versions for the application are used for receiving updates to the application. For example, if a system determines that a significant number of crash reports have been received from a version of the application from a first group of versions, then the system can instruct computing devices that report the crashes to switch to another group of versions in which the crash does not occur or has been fixed. The computing devices then receive updates to the application from the new group of versions. In some implementations, the system may switch the computing devices back to the original group of versions once the problem is corrected in the original group of versions. Accordingly, the computing devices then again receive updates to the application from the original group of versions.

Figure 1:
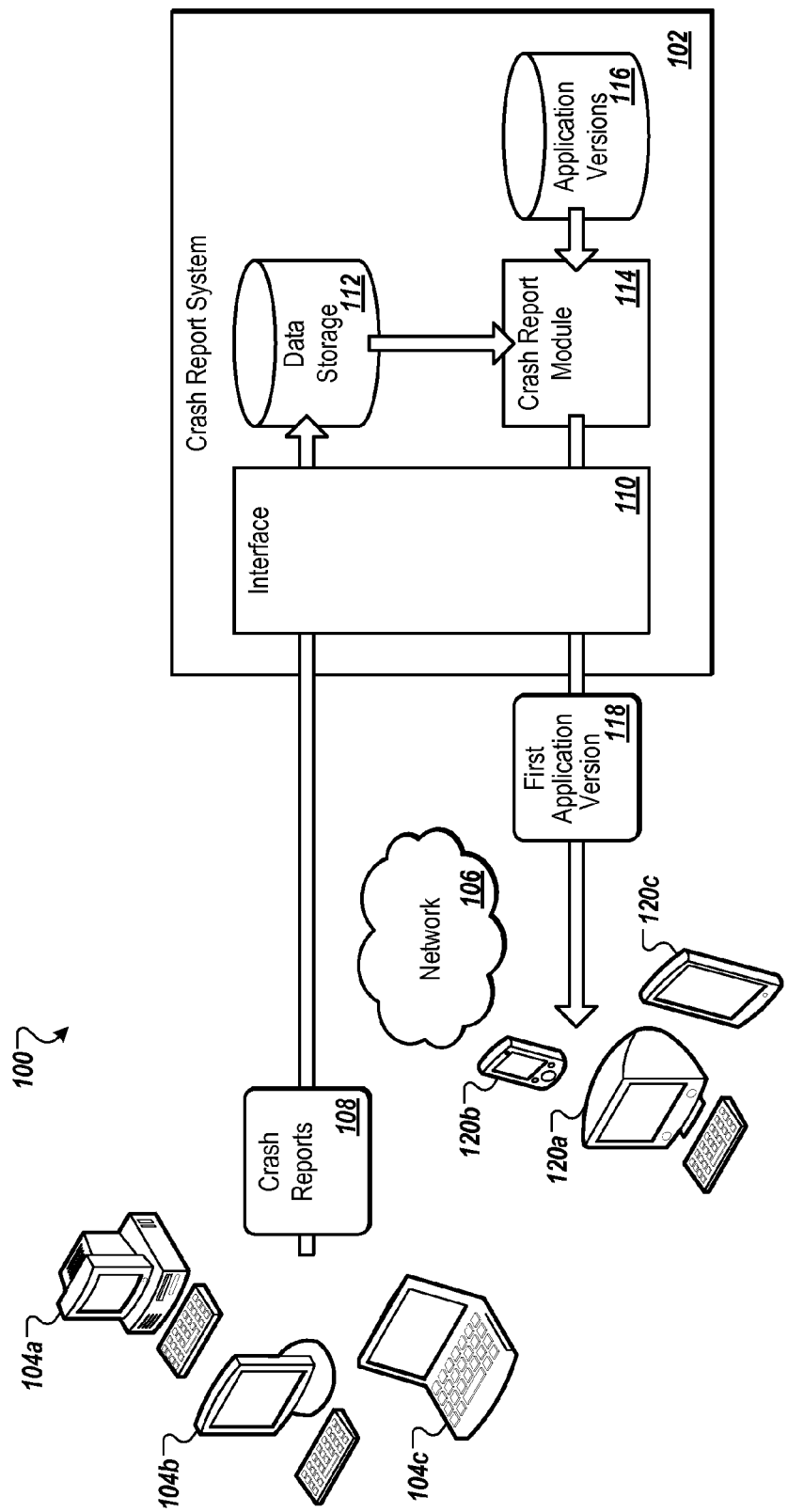
FIG. 1 is a schematic diagram that shows an example of a system for managing distribution of application versions.

FIG. 1 is a schematic diagram that shows an example of a system 100 for managing distribution of application versions. The system 100 includes a crash report system 102 in communication with multiple computing devices 104a-c over a network 106. Each of the computing devices 104a-c has a first version 118 of an application in operation at the respective computing device. At one or more of the computing devices 104a-c, the first version 118 of the application experiences a fault or problem that causes the application to crash. A crash can be, for example, an abnormal termination of the application, such as when an operating system terminates an application that attempts to access memory that the application is not permitted to access, the application becomes unresponsive, or the applications consumes more resources than what is allowed by the operating system. The ones of the computing devices 104a-c at which the application crashes submit one or more crash reports 108 to the crash report system 102.

The crash report system 102 includes an interface 110 for communicating with the network 106 and computing devices in communication with the network 106. The crash report system 102 receives the crash reports 108 through the interface 110. The crash report system 102 can, in some implementations, receive the crash reports 108 over time and store the crash reports 108 in a data storage 112 for subsequent processing.

The crash report system 102 includes a crash report module 114 that retrieves the crash reports 108 from the data storage 112 and processes the crash reports 108. In particular, the crash report module 114 analyzes the crash reports 108 to determine whether or not a first threshold amount of crash reports has been received for the first version of the application in operation at the computing devices 104a-c. In addition, the crash report module 114, or another module, has access to one or more versions 116 of the application, including the first version 118 of the application. If the crash report module 114 determines that the amount of the crash reports 108 received during a particular period of time is greater than the first threshold amount of crash reports, then the crash report module 114 prevents the first version 118 of the application from being provided or distributed to one or more additional computing devices 120a-c.

In some implementations, the crash report module 114 can analyze the crash reports 108 to determine whether or not a second threshold amount of crash reports has been received for the first version of the application in operation at the computing devices 104a-c. If the crash report module 114 determines that the amount of the crash reports 108 received during a particular period of time is less than the second threshold amount of crash reports, then the crash report module 114 provides or allows the first version 118 of the application to be provided to the additional computing devices 120a-c.

The amount of crash reports for a particular period of time can include, for example, multiple crash reports from the first version 118 of the application at one of the computing devices 104a-c. In another example, the amount of crash reports for a particular period of time can include one crash report for each of the computing devices 104a-c at which at least one crash occurs. In another example, the amount of crash reports for a particular period of time can be based on a frequency with which the crash reports occur during a particular period of time. In yet another example, the amount of crash reports for a particular period of time can be based on a comparison between a total number of the computing devices 104a-c that received the first version 118 of the application and a number of the ones of the computing devices 104a-c from which the crash reports 108 were received. In each case, the crash report module 114 compares the amount of the crash reports to the first and/or second threshold amount of crash reports to determine how to proceed with distribution of the first version 118 of the application.

The crash report module 114, or another module, can also provide a second version of the application to one or more of the computing devices 104a-c, such as the ones of the computing devices 104a-c that sent the crash reports 108. For example, if the crash report module 114 determines that the amount of the crash reports 108 received during a particular period of time is greater than the first threshold amount of crash reports, then the crash report module 114 can provide the second version of the application to the ones of the computing devices 104a-c that sent the crash reports 108. In some implementations, the crash report module 114 and/or the application at the computing devices 104a-c provides users with an option to accept or reject the change to the second versions of the application.

The second version of the application can be a previous version of the application, for example, from a same group of versions as the first version 118 of the application. For example, the crash report module 114 can determine that less than the first and/or second threshold amounts of crash reports were received from the previous version of the application and, as a result, provides the second version of the application. In another example, the crash report module 114 can determine that crash reports received from the second version of the application were caused by a different problem than the problem that resulted in the crash reports 108 from the first version 118 of the application and, as a result, provides the second version of the application.

Alternatively, the second version of the application can be a version of the application from another group of versions. For example, the crash report module 114 can determine that a more recent version than the first version 118 corrects a problem that resulted in the crash reports 108 from the first version 118 of the application. The more recent version can be from a group of versions that is updated more often than the group of versions to which the first version 118 of the application belongs, such as a group of development or testing versions as opposed to a group of stable or production versions. Development or testing versions may include, for example, relatively stable beta versions (e.g., released every few months), developer versions (e.g., released every few weeks), and canary versions (e.g., released every day or few days).

In some implementations, the information for the versions 116 of the applications also associates each version with one or more causes of crashes that are corrected by the version. The crash report module 114 may then use the lists of associated corrections for the versions 116 of the application to determine that the second version of the application corrects the problem that resulted in the crash reports 108.

Figure 2:
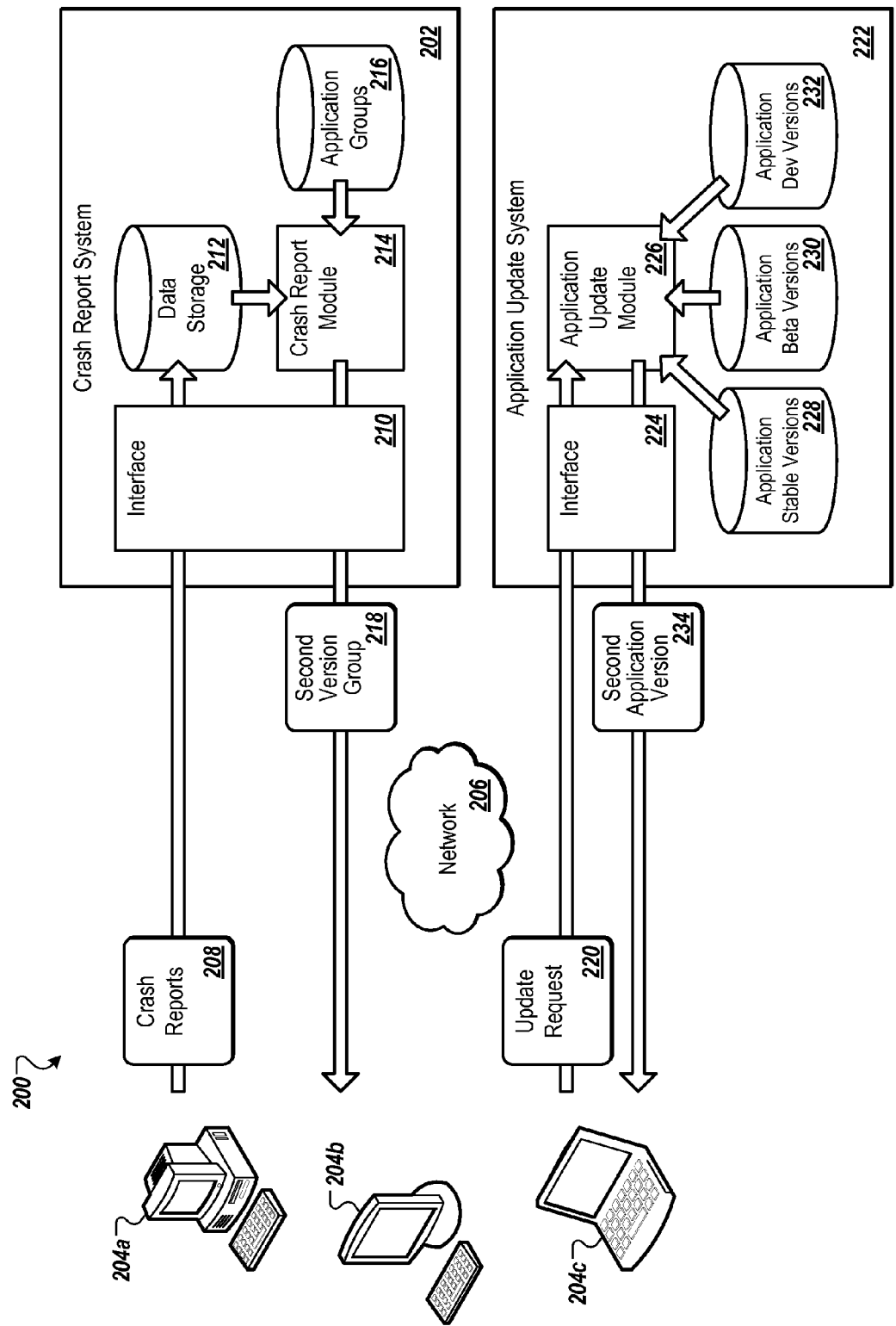
FIG. 2 is a schematic diagram that shows an example of a system for managing groups of application versions.

FIG. 2 is a schematic diagram that shows an example of a system 200 for managing groups of application versions. The system 200 includes a crash report system 202 in communication with multiple computing devices 204a-c over a network 206. The crash report system 202 receives one or more crash reports 208 from one or more of the computing devices 204a-c at which an application crash occurs. The crash report system 202 includes an interface 210 to the network 206 that receives the crash reports 208 and stores the crash reports in a data storage 212. The crash report system 202 includes a crash report module 214 that processes the crash reports 208.

In particular, the crash report module 214 analyzes the crash reports 208 to determine whether or not a first threshold amount of crash reports has been received for a first version of the application, from a first group of versions, in operation at the computing devices 204a-c. The computing devices 204a-c are configured to receive updates from the first group of versions that includes the first version of the application. For example, a user can make inputs to an application in operation at a computing device to configure the application to receive updates from the first group of versions. In another example, the first group of versions can be a default group of versions configured during installation of the application, such as a stable or production group of versions.

The crash report module 214, or another module, has access to one or more groups of versions 216 of the application, including the first group of versions of the application. The groups of versions 216 include information that relates each version within each group of versions to one or more causes of crashes that were corrected by the version. If the crash report module 214 determines that the amount of the crash reports 208 received during a particular period of time is greater than the first threshold amount of crash reports, then the crash report module 214 determines whether or not a cause or causes of the crash reports 208 are corrected by a second version of the application from a second group of versions from the groups of versions 216. In some implementations, the crash report module 214 also prevents the first version of the application from being provided or distributed to one or more additional computing devices in response to determining that the amount of the crash reports 208 received during a particular period of time is greater than the first threshold amount of crash reports.

If the crash report module 214 determines that the cause or causes of the crash reports 208 are corrected by the second version of the application from the second group of versions, then the crash report module 214 provides one or more instructions 218 to at least the ones of the computing devices 204a-c that sent the crash reports 208 to receive updates from the second group of versions. In some implementations, the crash report module 214 and/or the application at the computing devices 204a-c provides users with an option to accept or reject the change to the second group of versions.

The ones of the computing devices 204a-c that received the instructions 218 can each then send a request 220 to an application update system 222 for an update to the application from the second group of versions. The application update system 222 includes an interface 224 in communication with the network 206 that receives the request 220 from each of the computing devices and provides the request 220 to an application update module 226.

The application update system 222 also includes multiple groups of versions of the application. For example, the application update system 222 can include a group of stable application versions 228, a group of beta testing application versions 230, and a group of development application versions 232. The second group of versions can include, for example, the group of beta testing application versions 230, and the first group can include the group of stable application versions 228. Accordingly, the application update module 226 provides a second version 234 of the application from the group of beta testing application versions 230 to the ones of the computing devices 204a-c that sent the request 220.

Subsequently, the crash report module 214 can determine whether or not the cause or causes of the crash reports 208 are corrected by a third version of the application from the first group of versions. If the crash report module 214 determines that the cause or causes of the crash reports 208 are corrected by the third version of the application from the first group of versions, then the crash report module 214 provides one or more instructions to at least the ones of the computing devices 204a-c that sent the crash reports 208 to again receive updates from the first group of versions. The ones of the computing devices 204a-c that received the instructions can each then send a request to the application update system 222 for an update to the application from the first group of versions. Accordingly, the application update module 226 provides the third version of the application from the group of stable application versions 228 to the ones of the computing devices 204a-c that sent the request.

Figure 3A:
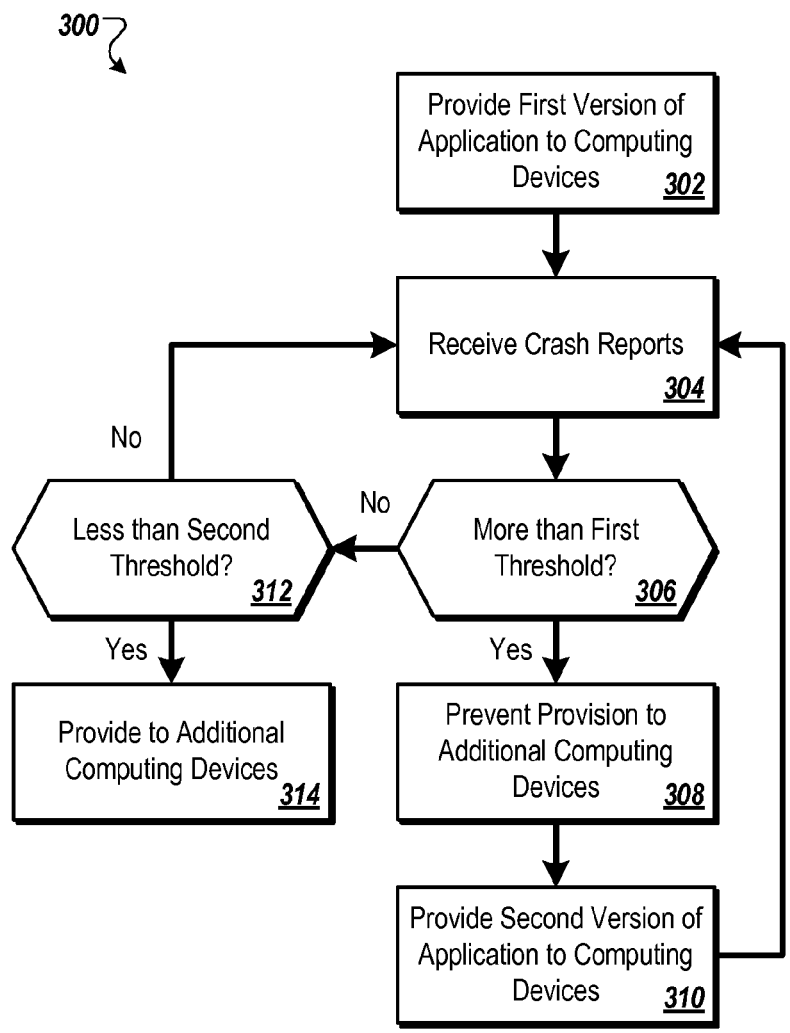
FIG. 3A is a flow chart that shows an example of a process for managing distribution of application versions.
Figure 3B:
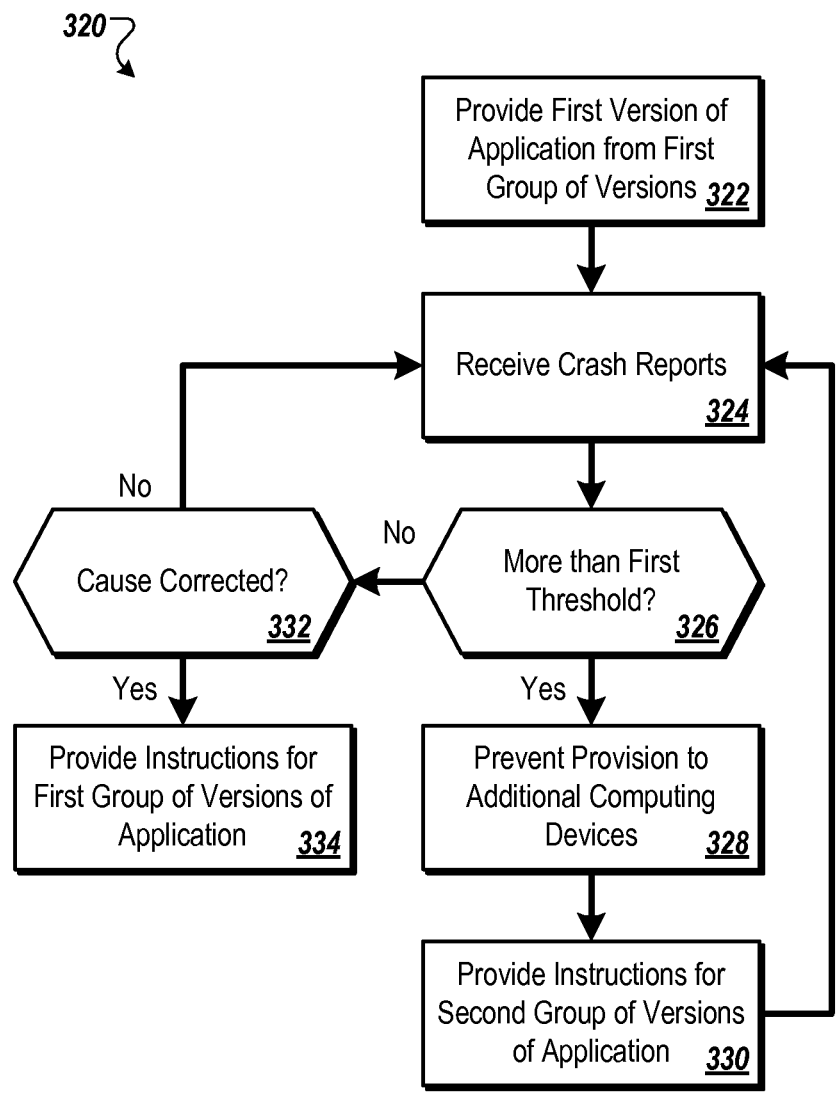
FIG. 3B is a flow chart that shows an example of a process for managing groups of application versions.

FIGS. 3A-B are flow charts that show examples of processes that may be performed, for example, by a system such as the system 100 and/or the system 200. One or more steps of the processes may be automatically performed by components of the system 100 and the system 200. For clarity of presentation, the description that follows uses the system 100 and the system 200 as examples for describing the processes. However, another system, or combination of systems, may be used to perform the processes.

Referring to FIG. 3A, a process 300 for managing distribution of application versions begins, in step 302, with providing a first version of an application to multiple initial computing devices. For example, the crash report system 102 can provide the first version 118 of the application to the computing devices 104a-c.

Next, in step 304, a first number of crash reports is received from the first version of the application at a first set of the initial computing devices over a first period of time. For example, one or more of the computing devices 104a-c can send the crash reports 108 to the crash report system 102.

If, in step 306, it is determined that more than a first threshold amount of crash reports have been received from the first version of the application at the first set of the initial computing devices over the first period of time, then, in step 308, the first version of the application is prevented from being provided to one or more additional computing devices and, in step 310, a second version of the application can be provided to at least the first set of the initial computing devices. For example, the crash report module 114 can determine that the crash reports 108 include more than a first threshold amount of crash reports. As a result, the crash report module 114 prevents distribution of the first version 118 of the application to the additional computing devices 120a-c. In addition, the crash report module 114 can provide a second version of the application to the ones of the computing devices 104a-c that sent the crash reports 108.

Alternatively, or in addition, in response to determining that more than the first threshold amount of crash reports have been received, instructions can be provided to at least the first set of the initial computing devices to include additional information in subsequent crash reports. For example, the crash report module 114 can provide instructions to the ones of the computing devices 104a-c that sent the crash reports 108 or more of the computing devices 104a-c to provide additional information to the crash report system 102 regarding crashes of the first version of the application after a next occurrence of a crash.

The step 304 can be repeated, and a second number of crash reports is received from the first version of the application at a second set of the initial computing devices over a second period of time. For example, the crash report module 114 can receive additional crash reports from the first version and/or the second version of the one or more of the computing devices 104a-c.

If, in step 306, it is not determined that more than the first threshold amount of crash reports have been received from the first version of the application at the first set of the initial computing devices over the first period of time, then, in step 312, it is determined whether or not less than a second threshold amount of crash reports has been received from the first version of the application at the second set of the initial computing devices over the second period of time. If less than the second threshold amount has been received, then, in step 314, the first version of the application is provided to the additional computing devices. For example, the crash report module 114 can provide the first version 118 of the application to the additional computing devices 120a-c in response to determining that the first version of the application at the computing devices 104a-c resulted in a number of crash reports that is less than the second threshold amount of crash reports during the second period of time.

If, in step 312, it is not determined that less than the second threshold amount of crash reports has been received from the first version of the application at the second set of the initial computing devices over the second period of time, then the step 304 can be repeated and another number of crash reports is received from the first and/or second version of the application at another set of the initial computing devices over another period of time. For example, the crash report module 114 can receive additional crash reports from the first version and/or the second version of the one or more of the computing devices 104a-c.

Determining that more than the first threshold amount of crash reports have been received can be based on a frequency with which the first number of crash reports occur at the first set of the initial computing devices over the first period of time. Determining that more than the first threshold amount of crash reports have been received can be based on a comparison between a number of the first set of the initial computing devices from which the first number of crash reports were received and a number of the initial computing devices to which the first version of the application was provided.

Referring to FIG. 3B, a process 320 for managing groups of application versions begins, in step 322, with providing a first version of an application from a first group of versions to multiple initial computing devices. For example, the application update system 222 can provide the first version of the application from the group of stable application versions 228 to the computing devices 204a-c.

Next, in step 324, a first number of crash reports is received from the first version of the application at a first set of the initial computing devices over a first period of time. For example, one or more of the computing devices 204a-c can provide the crash reports 208 to the crash report system 202 that result from crashes of the first version of the application.

If, in step 326, it is determined that more than a first threshold amount of crash reports have been received from the first version of the application at the first set of the initial computing devices over the first period of time, then, in step 328, the first version of the application is prevented from being provided to one or more additional computing devices and, in step 330, instructions are provided to at least the first set of the initial computing devices to retrieve updates to the application from a second group of versions rather than the first group of versions. The updates from the second group include an update that provides a second version of the application from the second group of versions to at least the first set of the initial computing devices.

For example, the crash report module 214 can determine that the crash reports 208 from the first period of time include more than the threshold amount of crash reports. As a result, the crash report module 214 provides instructions to at least the ones of the computing devices 204a-c that sent the crash reports 208 to retrieve updates to the application from the group of beta testing application versions 230. In addition, the crash report module 214 can prevent the first version of the application from being distributed to additional computing devices. For example, the crash report module 214 can provide instructions to the additional computing devices to retrieve updates to the application from the group of beta testing application versions 230. In another example, the crash report module 214 allows the additional computing devices to remain on the group of stable application versions 228 and send a command to the application update module 226 to prevent the first version of the application from being sent to the additional computing devices in response to subsequent update requests from the additional computing devices.

Alternatively or in addition, instructions can be provided to at least the first set of the initial computing devices to include additional information in subsequent crash reports in response to determining that more than the first threshold amount of crash reports have been received. For example, the crash report module 214 can provide instructions to the ones of the computing devices 204a-c that sent the crash reports 208 to provide additional crash related information for subsequent crashes of the first and/or second versions of the application.

The step 324 can be repeated, and additional crash reports can be received from one or more versions of the application at the initial computing devices. For example, the crash report system 202 can receive one or more additional crash reports from one or more of the computing devices 204a-c that result from crashes of the first and/or second version of the application.

If, in step 326, it is not determined that more than the first threshold amount of crash reports have been received from the first version of the application at the first set of the initial computing devices over the first period of time, then, in step 332, it is determined whether or not a third version of the application from the first group of versions corrects a cause of the first number of crash reports. If the third version does correct the cause, then, in step 334, instructions are provided to at least the first set of the initial computing devices to retrieve updates to the application from the first group of versions rather than the second group of versions.

The updates from the first group include an update that provides the third version of the application to at least the first set of the initial computing devices. For example, the crash report module 214 can determine that the third version of the application from the group of stable application versions 228 corrects the cause of the crash reports 208. In response, the crash report module 214 provides instructions to the computing devices 204a-c to retrieve updates to the application from the group of stable application versions 228 rather than the group of beta testing application versions 230.

If the third version does not correct the cause, then the step 324 can be repeated, and additional crash reports can be received from one or more versions of the application at the initial computing devices. For example, the crash report system 202 can receive one or more additional crash reports from one or more of the computing devices 204a-c that result from crashes of the first and/or second version of the application.

Figure 4:
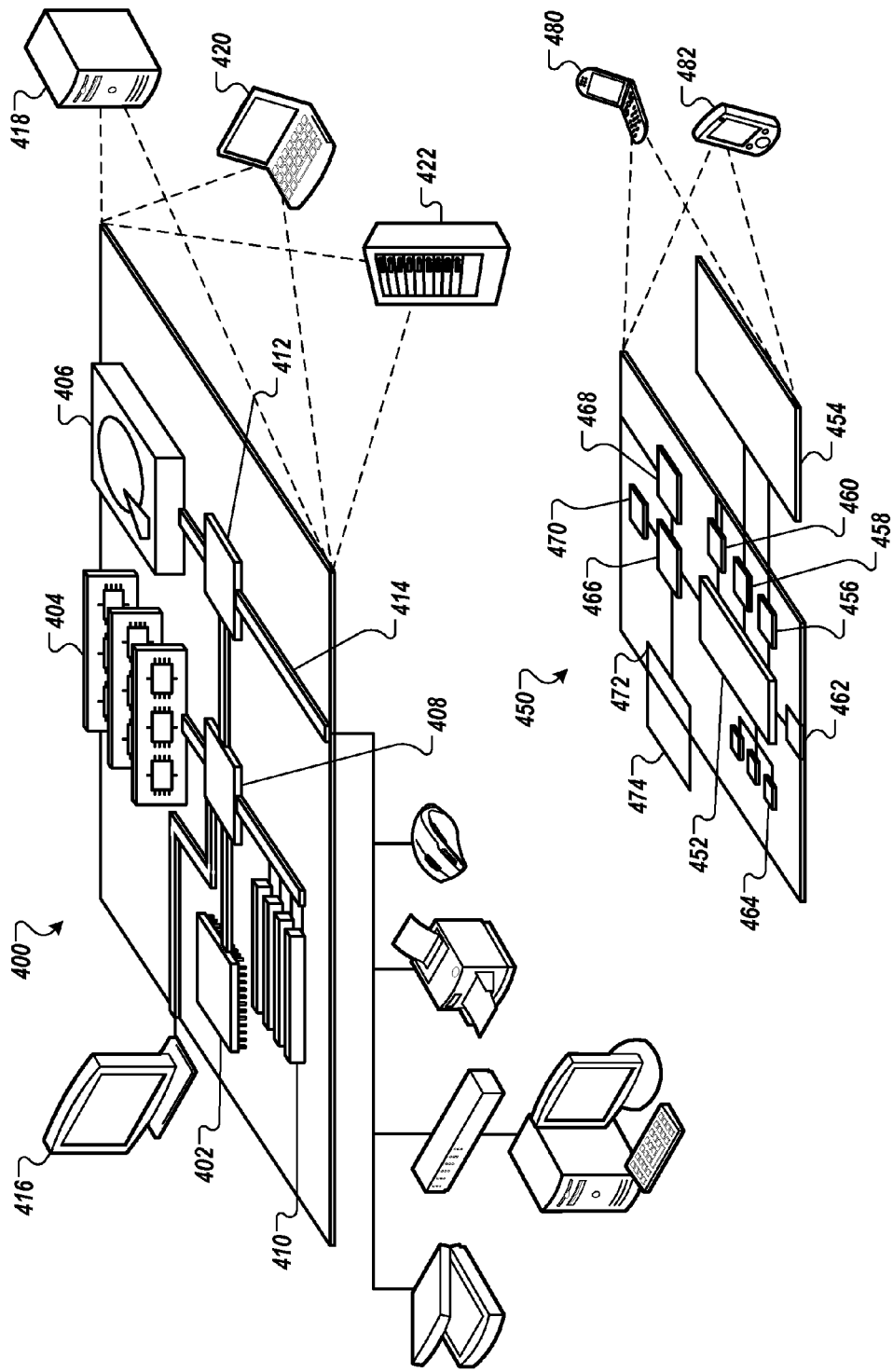
FIG. 4 is a schematic diagram that shows an example of a computing device and a mobile computing device.

FIG. 4 is a schematic diagram that shows an example of a computing device 400 and an example of a mobile computing device that can be used to implement the systems and techniques described here. The computing device 400 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations.

A computer program product can be tangibly embodied in an information carrier. The computer program product may contain instructions that, when executed, perform one or more methods, such as those described above. The computer program product can also be tangibly embodied in a computer- or machine-readable medium, such as the memory 404, the storage device 406, or memory on the processor 402.

The high-speed interface 408 manages bandwidth-intensive operations for the computing device 400, while the low-speed interface 412 manages lower bandwidth-intensive operations. Such allocation of functions is exemplary only. In some implementations, the high-speed interface 408 is coupled to the memory 404, the display 416 (e.g., through a graphics processor or accelerator), and to the high-speed expansion ports 410, which may accept various expansion cards (not shown). In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 418, or multiple times in a group of such servers. In addition, it may be implemented in a personal computer such as a laptop computer 420. It may also be implemented as part of a rack server system 422. Alternatively, components from the computing device 400 may be combined with other components in a mobile device (not shown), such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a microdrive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. The memory 464 may include, for example, flash memory and/or NVRAM memory (non-volatile random access memory).

An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provide as a security module for the mobile computing device 450, and may be programmed with instructions that permit secure use of the mobile computing device 450. In addition, secure applications may be provided via the SIMM cards, along with additional information, such as placing identifying information on the SIMM card in a secure manner.

In some implementations, a computer program product is tangibly embodied in an information carrier. The computer program product contains instructions that, when executed, perform one or more methods, such as those described above. The computer program product can be a computer- or machine-readable medium, such as the memory 464, the expansion memory 474, or memory on the processor 452. In some implementations, the computer program product can be received in a propagated signal, for example, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 468 using a radio-frequency. In addition, short-range communication may occur, such as using a Bluetooth, Wi-Fi, or other such transceiver (not shown). In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

For situations in which the systems discussed here use personal information about users, the users may be provided with an opportunity to opt in/out of programs or features that use personal information (e.g., system state information, such as contents of memory or instructions executed on a processor by an application in operation at a computing device). In addition, certain data may be made anonymous in one or more ways before it is stored or used, so that personally identifiable information is removed. For example, a user's identity may be made anonymous so that the no personally identifiable information can be determined for the user. In addition, a user's geographic location may be generalized where location information is obtained (such as to a city, zip code, or state level), so that a particular location of a user cannot be determined.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method for application lifecycle management, the method comprising:
   receiving a first number of crash reports from a first version of an application at multiple initial computing devices over a first period of time, wherein the first version of the application is from a first group of versions;
   determining that the first number of crash reports includes more than a first threshold amount of crash reports;
   determining that a second version of the application from a second group of versions corrects a cause of the first number of crash reports in response to determining that the first number of crash reports includes more than the first threshold amount of crash reports;
   providing instructions to the multiple initial computing devices to retrieve updates to the application from the second group of versions rather than the first group of versions in response to determining that the second version of the application from the second group of versions corrects the cause of the first number of crash reports,
   determining that a third version of the application from the first group of versions corrects the cause of the first number of crash reports; and
   providing instructions to the multiple initial computing devices to retrieve updates to the application from the third version of the application of the first group of versions rather than from the second group of versions in response to determining that the third version of the application from the first group of versions corrects the cause of the first number of crash reports.

2. The method of claim 1, further comprising preventing provision of the first version of the application to one or more additional computing devices in response to determining that the first number of crash reports includes more than the first threshold amount of crash reports.

3. The method of claim 1, wherein determining that the first number of crash reports includes more than the first threshold amount of crash reports is based on a frequency with which the first number of crash reports occur at the multiple initial computing devices over the first period of time.

4. The method of claim 3, wherein determining that the first number of crash reports includes more than the first threshold amount of crash reports is based on a comparison between a number of the multiple initial computing devices from which the first number of crash reports were received and a number of the multiple initial computing devices to which the first version of the application was provided.

5. The method of claim 4, wherein determining that the third version of the application from the first group of versions corrects the cause of the first number of crash reports comprises:
   receiving a second number of crash reports from the third version of the application at one or more other computing devices over a second period of time; and
   determining that the second number of crash reports includes less than a second threshold amount of crash reports, wherein the second threshold amount of crash reports is lower than the first threshold amount of crash reports.

6. The method of claim 1, further comprising providing instructions to the multiple initial computing devices to include additional information in subsequent crash reports in response to determining that the first number of crash reports includes more than the first threshold amount of crash reports.

7. A computer-implemented system for application lifecycle management, the system comprising:
   an interface that receives a first number of crash reports from a first version of an application at multiple initial computing devices over a first period of time, wherein the first version of the application is from a first group of versions;
   one or more memories that store the first number of crash reports and relationships between groups of versions and causes of crashes of the application, wherein the groups of versions include at least the first group of versions and a second group of versions; and
   a crash report module that determines that the first number of crash reports includes more than a first threshold amount of crash reports, and determines that a second version of the application from the second group of versions corrects a cause of the first number of crash reports and, in response, provides instructions to the multiple initial computing devices to retrieve updates to the application from the second group of versions rather than the first group of versions,
  wherein the crash report module determines that a third version of the application from the first group of versions corrects the cause of the first number of crash reports and, in response, provides instructions to the multiple initial computing devices to retrieve updates to the application from the third version of the application of the first group of versions rather than from the second group of versions.

8. The system of claim 7, further comprising an application update module that provides the second version of the application to the multiple initial computing devices in response to requests from the multiple initial computing devices to update the application from the second group of versions.

9. The system of claim 8, wherein the application update module prevents provision of the first version of the application to one or more additional computing devices in response to the crash report module determining that the first number of crash reports includes more than the first threshold amount of crash reports.

10. The system of claim 7, wherein the crash report module determines that the first number of crash reports includes more than the first threshold amount of crash reports based on a frequency with which the first number of crash reports occur at the multiple initial computing devices over the first period of time.

11. The system of claim 10, wherein the crash report module determines that the first number of crash reports includes more than the first threshold amount of crash reports based on a comparison between a number of the multiple initial computing devices from which the first number of crash reports were received and a number of the multiple initial computing devices to which the first version of the application was provided.

12. The system of claim 11, wherein the interface receives a second number of crash reports from the third version of the application at one or more other computing devices over a second period of time; and
  wherein the crash report module determines that the third version of the application from the first group of versions corrects the cause of the first number of crash reports based on determining that the second number of crash reports includes less than a second threshold amount of crash reports that is lower than the first threshold amount of crash reports.

13. The system of claim 7, wherein the crash report module provides instructions to the multiple initial computing devices to include additional information in subsequent crash reports in response to determining that the first number of crash reports includes more than the first threshold amount of crash reports.

14. A non-transitory machine-readable storage medium comprising instructions stored therein, which when executed by one or more processors, cause the one or more processors to perform operations comprising:

receiving a first number of crash reports from a first version of an application at multiple initial computing devices over a first period of time, wherein the first version of the application is from a first group of versions;
  determining that the first number of crash reports includes more than a first threshold amount of crash reports;
  determining that a second version of the application from a second group of versions corrects a cause of the first number of crash reports in response to determining that the first number of crash reports includes more than the first threshold amount of crash reports;
  providing instructions to the multiple initial computing devices to retrieve updates to the application from the second group of versions rather than the first group of versions in response to determining that the second version of the application from the second group of versions corrects the cause of the first number of crash reports,
  determining that a third version of the application from the first group of versions corrects the cause of the first number of crash reports; and
  providing instructions to the multiple initial computing devices to retrieve updates to the application from the third version of the application of the first group of versions rather than from the second group of versions in response to determining that the third version of the application from the first group of versions corrects the cause of the first number of crash reports.

15. The non-transitory machine-readable medium of claim 14, the operations further comprising:
  preventing provision of the first version of the application to one or more additional computing devices in response to determining that the first number of crash reports includes more than the first threshold amount of crash reports.

16. The non-transitory machine-readable medium of claim 14, wherein determining that the first number of crash reports includes more than the first threshold amount of crash reports is based on a frequency with which the first number of crash reports occur at the multiple initial computing devices over the first period of time.

17. The non-transitory machine-readable medium of claim 14, wherein determining that the first number of crash reports includes more than the first threshold amount of crash reports is based on a comparison between a number of the multiple initial computing devices from which the first number of crash reports were received and a number of the multiple initial computing devices to which the first version of the application was provided.

18. The non-transitory machine-readable medium of claim 14, the operations further comprising:
  providing instructions to the multiple initial computing devices to include additional information in subsequent crash reports in response to determining that the first number of crash reports includes more than the first threshold amount of crash reports.

* * * * *